United States Patent [19]

DeRosa et al.

[11] Patent Number: 5,160,922
[45] Date of Patent: Nov. 3, 1992

[54] SYSTEM AND METHOD FOR DYNAMIC AVOIDANCE OF A SIMULTANEOUS SWITCHING OUTPUT LIMITATION OF AN INTEGRATED CIRCUIT CHIP

[75] Inventors: John DeRosa, Princeton; Lauren M. Hagstrom, Worcester; Lon S. Hilde, Lunenburg; Oren Wiesler, Acton, all of Mass.

[73] Assignee: Digital Equipment Corporation, Maynard, Mass.

[21] Appl. No.: 546,556

[22] Filed: Jun. 29, 1990

[51] Int. Cl.⁵ .............................................. G06F 13/00
[52] U.S. Cl. .............................. 340/825.5; 364/242.8; 364/242.93; 364/927.8; 364/DIG. 1; 364/DIG. 2; 370/85.6
[58] Field of Search ............... 340/825.5, 825.51; 364/200 MS File, 900 MS File; 370/85.6

[56] References Cited

U.S. PATENT DOCUMENTS

| | | | |
|---|---|---|---|
| 4,249,093 | 2/1981 | Henig | 340/825.5 |
| 4,669,079 | 5/1987 | Blum | 340/825.5 |
| 4,977,557 | 12/1990 | Phung et al. | 340/825.5 |
| 4,993,022 | 2/1991 | Kondo et al. | 370/85.6 |
| 5,001,707 | 3/1991 | Kositpaiboon et al. | 370/85.6 |

*Primary Examiner*—Donald J. Yusko
*Assistant Examiner*—John Giust
*Attorney, Agent, or Firm*—Kenyon & Kenyon

[57] ABSTRACT

A system and method for limiting the number of simultaneously switching outputs of an integrated circuit chip to at or below a predetermined limit for the chip during a short, predetermined time window by dynamically arbitrating request signals from discrete on-chip logic elements for assignment of output pins according to the priority of the request signals based on the type and intended use of output signals from such elements, and the immediate state of the integrated circuit chip.

42 Claims, 2 Drawing Sheets

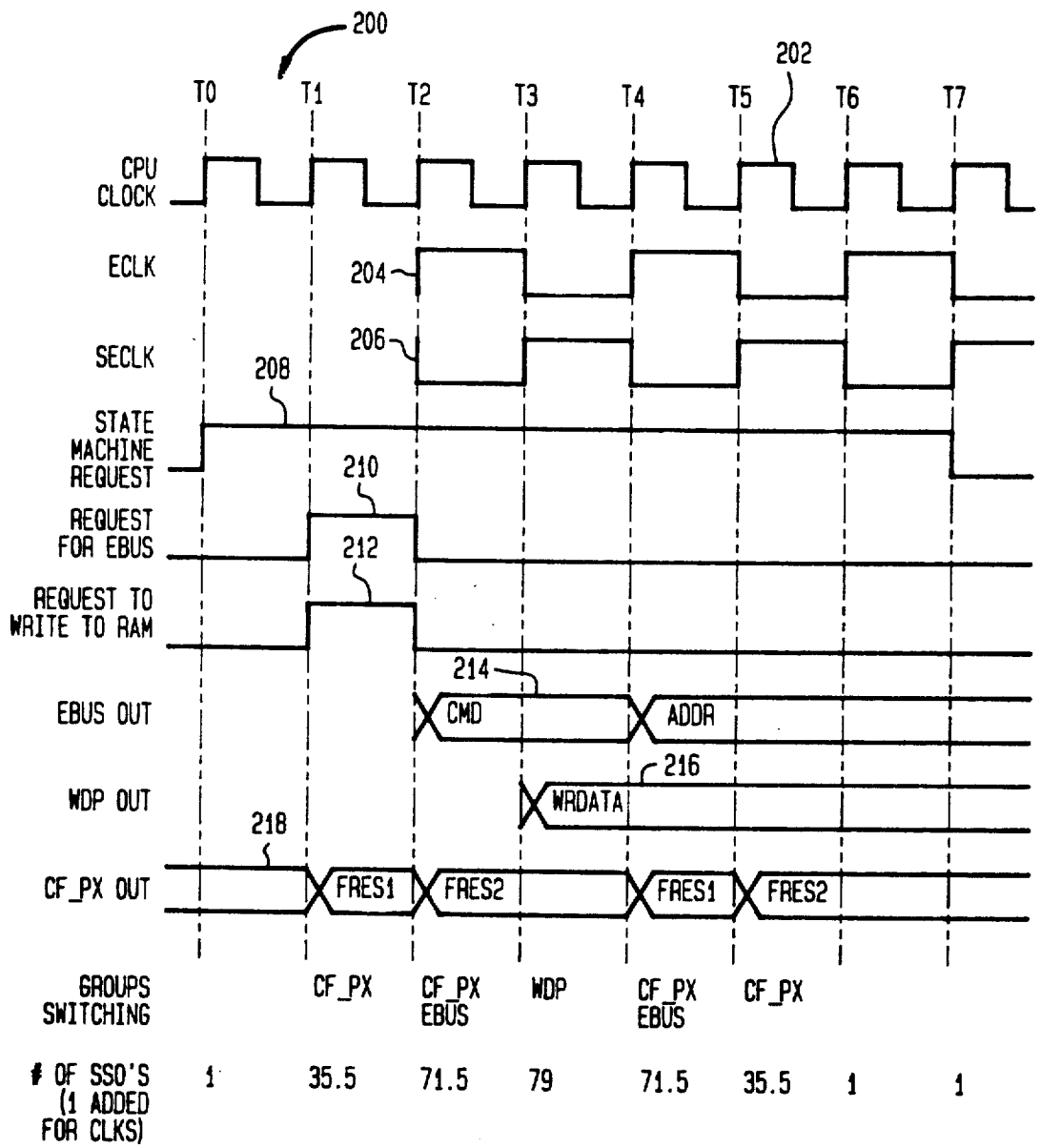

SYSTEM AND METHOD FOR DYNAMIC AVOIDANCE OF A SIMULTANEOUS SWITCHING OUTPUT LIMITATION OF AN INTEGRATED CIRCUIT CHIP

TECHNICAL FIELD

The present invention relates generally to the field of systems and methods used to control the signals output from digital integrated circuit chips. More specifically, the present invention relates to systems and methods for controlling the number of signals output from a digital integrated circuit that may simultaneously switch within a short, predetermined period of time.

BACKGROUND OF THE INVENTION

In the continuing development of more advanced digital integrated circuit chips ("ICs"), it has been the object to make them smaller and faster. With this reduction in size and increase in the speed at which such advanced digital ICs process information, there are also physical constraints associated with the small package size and the ability to get signals on and off the chips. These constraints, which are reflected in the electronic characteristics of the package, cause problems that surface when such advanced chips are in use.

One such problem that has arisen in advanced IC chips in that only a certain number of output pins can simultaneously switch in a short, predetermined period of time without detrimentally affecting the operation of the chip. This short, predetermined period of time depends upon the digital IC and the specific IC package. But, it is now typically in the range of 2-3 ns (nanoseconds). Therefore, IC designers must ensure that the IC that they are designing does not violate the simultaneously switching output ("SSO") limit for a given digital IC chip.

Even though the SSO limit affects digital ICs generally, it poses a clearly recognized problem in emitter-coupled logic ("ECL") and metal-oxide semiconductor ("MOS") IC chips.

ECL and MOS devices have a plurality of pins. Some are exclusively input pins or output pins, while others may serve as both input and output pins. The SSO limit affects an IC chip's output scheme, but does not affect the input pins since any switching with respect to the input pins takes place off chip at the signal source.

The cycle time for advanced ECL or MOS devices, which is the period of the primary clock that controls the IC's operation, may at the present time approach 4 ns. However, it is anticipated that future devices will have cycle times shorter than this. As stated, the short, predetermined period that is associated with the SSO limit is presently in the range of 2-3 ns. This SSO limit period, therefore, may presently constitute ½ the cycle time. And since cycle times are trending to be shorter in the future, the SSO period may constitute more than ½ of an IC's cycle time in the future.

If the SSO limit is exceeded, it is not known what the effect on a particular chip's operation will be. Two of the known deviations from design specifications operation of chips caused by violating the SSO limit have been internal state changes and the instability of the outputs. Also, IC chips that have had their SSO limit violated will usually require an extended settling time before they can be used again. In sum, exceeding the SSO limit effectively renders digital IC chips useless at least for a while. These potential problems created by violating the SSO limit have caused chip manufacturers not to guarantee chip operation according to design specifications if the SSO limitation is violated.

There are some suggested methods for preventing advanced digital IC chips from violating the SSO limit; however, these methods either are very costly or require the chip processing speed to be significantly reduced.

One costly solution is to reconfigure the IC packaging. This can be done in several ways. For example, all of the output pins can be differential output pins, or the SSO limit can be raised, or a larger number of grounds can be incorporated in the package design. Another costly method is to reconfigure the chip so that the output signals are served in a lock-step fashion.

A suggested solution that affects the speed of the digital IC chip is to stagger the outputs over a longer time window. Another is to design the digital IC chip with long cycle times so that the chance of violating the SSO limit is minimal.

All of these possible solutions, however, go directly against the desire to make digital IC chips cheaper, smaller, and faster. This also has a detrimental effect on the overall system of which the digital IC chips are part. Thus, there is a need to overcome these problems associated with a digital IC chip's SSO limit without requiring a change to the chip' package design or significantly affecting the chip' processing speed.

SUMMARY OF THE INVENTION

The present invention provides a system and method to avoid violating the simultaneous switching output ("SSO") limit of a digital IC chip. Such system and method dynamically control the number of outputs of the chip during a short, predetermined time period for which the SSO limit is effective; thereby, preventing the violation of the IC chip's SSO limit.

According to the system and method of the present invention, the output pins of a digital IC chip are treated as chip resources for which the signals queued for output from the chip must compete. The system through which the method is practiced includes a central arbiter ("CARB") which dynamically arbitrates requests associated with the various output signals based on predetermined criteria so that a maximum number of such signals may be output from the IC chip in the short, predetermined time period that the SSO limit is effective. This dynamic arbitration scheme ensures that the IC chip's SSO limit is not violated, while not requiring more expensive packaging, more ground pins, the special clock distribution required for staggered outputs, or a slower IC clock. Also, since the arbitration is dynamic, IC and system performance is maintained, instead of degraded, which is what would happen if the IC cycle time slowdown solution was used.

The present invention provides a system and method that control the maximum number simultaneously switching outputs in a short, predetermined time period.

The present invention also provides a system in which, and method by which, the output pins are dynamically arbitrated for by the signal outputs in a manner that considers various criteria so that the SSO limit of a digital IC chip is not exceeded.

The present invention will be set forth in detail in the remainder of the specification and in the appended drawings.

BRIEF DESCRIPTION OF THE DRAWINGS

FIG. 2 are representative timing diagrams associated with the present invention.

DETAILED DESCRIPTION OF THE INVENTION

Figure 1:
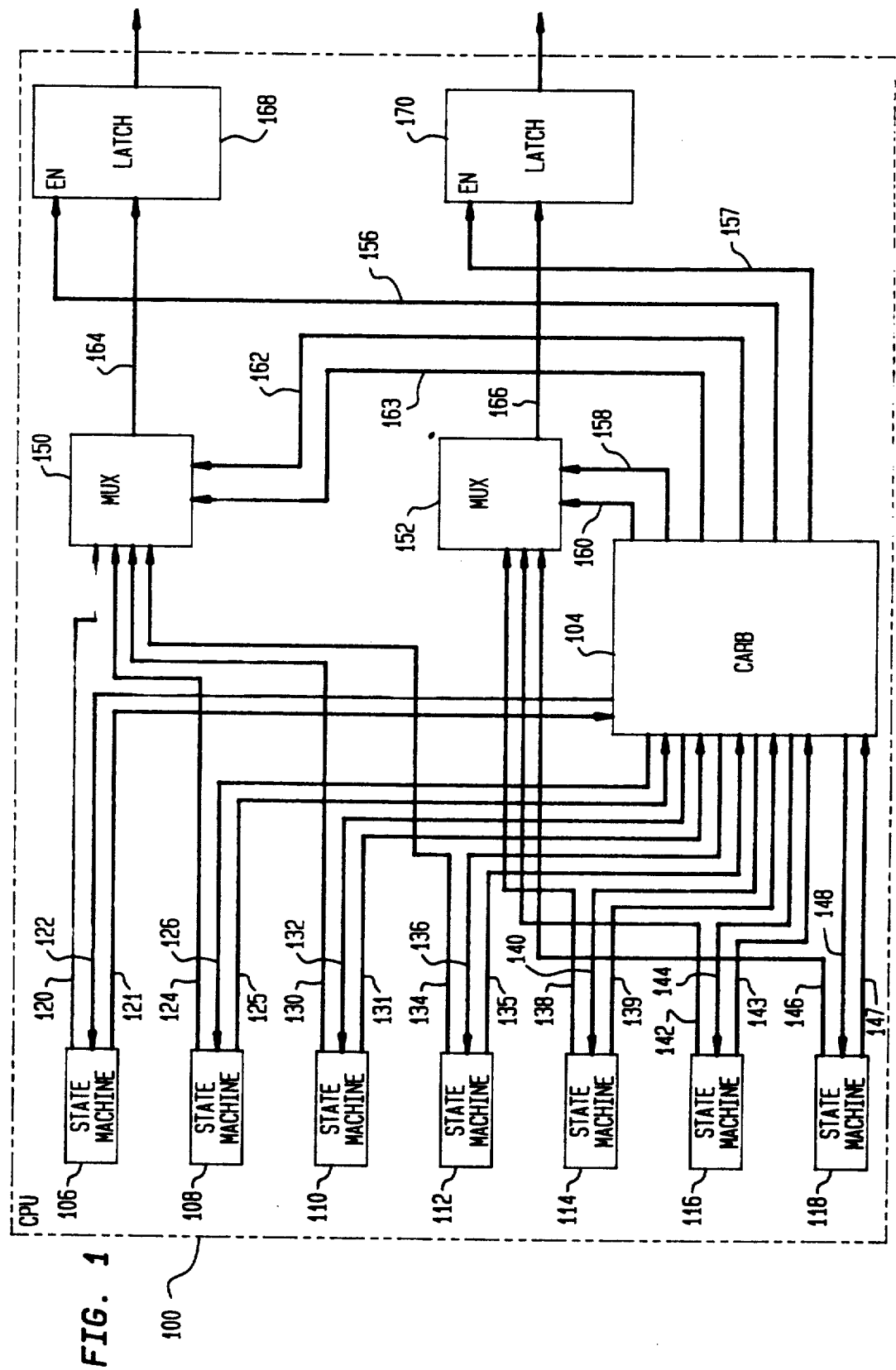
FIG. 1 is a schematic drawing of the representative central processing unit ("CPU") that includes the present invention.

The present invention is a system and method for avoiding violation of the SSO limit in digital IC chips, and in particular in ECL and MOS IC chips.

The system of the invention comprises a central arbiter ("CARB") through which the method of the present invention is carried out. The CARB, through arbitration, determines which output signals are assigned output pins. The CARB treats the output pins as chip resources and the outputs as clients vying for those resources. Considering various criteria, the CARB arbitrates which clients are assigned resources and which clients will have to wait.

The criteria that the CARB considers in arbitration includes the type of, and need for, the information on specific signals queued for output, the period of time that signals have been queued for output, and the current clock cycle. Using this criteria, the CARB prioritizes and arbitrates the signals for output from the output pins in a manner that will not violate the digital IC chip's SSO limit.

In FIG. 1, the system of the invention is shown in a portion of a representative CPU. The system, as stated, is embodied as the CARB, which as shown, may be interconnected with state machines, multiplexers ("MUXs"), and output latches of the CPU. The schematic that is shown is only representative of some connections to the CARB, but not all. In actuality, as would be understood by a person of ordinary skill in the art, any CPU logic element that generates signals that are to be output from the CPU would similarly connect to the CARB and output latches, with or without being processed by a MUX.

Referring to FIG. 1, representative CPU 100 is shown. CPU 100 includes the system of the present invention, CARB 104. State machines 106, 108, 110, 112, 114, 116, and 118 are generic state machines. These state machines may be adders, or multipliers, or subtractors, or any other type of conventional logic element that would generate an output signal for transmission off of CPU 100.

In FIG. 1, the lines that connect the separate components are shown as single bit lines for the purposes of simplicity. It is understood that each of these lines may in fact be multiple bit lines. Also, the latches may be flip-flops or any other state device as used to transfer signals off-chip The outputs of state machines 106, 108, 110, and 112 on lines 120, 124, 130, and 134, respectively, are input to MUX 150. The output of MUX 150 on line 164 is input to latch 168. The outputs of latch 168 connect to predetermined output pins of CPU 100. Similarly, the outputs of state machines 114, 116, and 118 on lines 138, 142, and 146, respectively, are input to MUX 152. The output of MUX 152 on line 166 is input to latch 170. The outputs of latch 170 connect to predetermined output pins of CPU 100.

Uni-directional REQ (request) lines 121, 125, 131, 135, 139, 143, and 147 connect from state machines 106, 108, 110, 112, 114, 116, and 118 to the CARB, respectively. Uni-directional ACK (acknowledge) lines 122, 126, 132, 136, 140, 144, and 148 Connect from the CARB to state machines 106, 108, 110, 112, 114, 116, and 118, respectively. State machines 106, 108, 110, 112, 114, 116, and 118 send REQ signals for the output pins to CARB 104 over the REQ lines. CARB 104 at the completion of arbitration sends an ACK (acknowledge) signal over the separate ACK lines to the state machines whose outputs have been granted access to one or more of the chip resources, the output pins.

CARB 104, in conjunction with performing arbitration, also may control MUXs 150 and 152, and latches 168 and 170. With regard to MUX 150, CARB 104 supplies the signals on lines 162 and 163 which connect to the control inputs to that MUX. In like fashion, CARB 104 provides the control signals on lines 158 and 160 to MUX 152. These signals control which of the various input signals to the respective MUXs are output to the latches.

The signal output from CARB 104 on line 156 is input to the output enable input to latch 168 and the signal on line 157 is input to the output enable input to latch 170. When these signals have the proper logic state, the latched values of the respective latches are output from CPU 100 on the output pins that connect to the outputs of these latches. Hence, this is yet another aspect of the invention by which CARB 104 controls the chip resources, the output pins.

Now having given a general example of a representative CPU that includes that system of the present invention, more detailed examples are provided.

A digital IC chip with 326 pins was designed with a CARB of the present invention. The 326 pins include 125 input pins and 201 output pins. This chip has a SSO limit of 96 for a 2 ns time period; so, no more than that number of output pins are allowed to be switched for any 2 ns time window.

The CARB considers the 201 output pins chip resources and dynamically arbitrates the signals queued for output for these resources. That is, the CARB dynamically arbitrates signals queued for output in any given 2 ns time window of a 4 ns cycle for the resources in a manner that avoids violating the SSO limit.

The output pins of the digital IC chip are of two types. The first type is single-ended output pins and the second type is differential output pins. For the purpose of determining the number of output pins that are switching at any given time, each pin type is assigned a penalty factor: single-ended pins are assigned a penalty factor of "1" and each pair of differential pins is assigned a penalty factor of "0.5."

In determining the penalty factor for single-end output pins for arbitration purposes, the number of single-ended output pins is counted and that number is the penalty factor. The method for determining the penalty factor for differential pins is multiplying penalty factor of "0.5" times the number of pairs of differential pins. Thus, the penalty factor for differential output pins is determined by the expression:

$$Pen.Fac. = (N) \times (0.5) \tag{1}$$

where,

Pen.Fac. = Penalty Factor
N = the number of differential output pins.

To efficiently perform the method of the present invention, it may be desirable, though not required, to group certain of the outputs so that they may be arbitrated together rather than all of the outputs being arbitrated separately. A representative grouping of outputs for the digital IC chip is shown in Table 1.

TABLE 1

| Group Name | Output Name | Quan. | Pin Type | SSO Penalty |
|---|---|---|---|---|
| WDP | RAM Write Data | 78 | S.E. | 78 |
| TAG | RAM Tag Data | 14 | S.E. | 14 |
| EBUS | E-bus | 36 | S.E. | 36 |
| CF_PX | CF_P Bus<31:16> | 16 | S.E. | 16 |
| | CF_PX Bus<15:0> | 32 | Diff. | 8 |
| | CF_P Commands | 12 | Diff. | 3 |
| | CF_P Parity | 1 | S.E. | 1 |
| | CF_X Parity | 1 | S.E. | 1 |
| | Misc CF_P Cntrl | 3 | S.E. | 3 |
| | Misc CF_X Cntrl | 2 | S.E. | 2 |
| | CF_P Init | 2 | Diff. | 0.5 |
| CLKS | CF_P Fwd Clock | 2 | Diff. | 0.5 |
| | CF_X Fwd Clock | 2 | Diff. | 0.5 |
| | | 201 | | 163.5 | where,
S.E. = single-ended output pins.
Diff. = differential output pins.
P (or P-chip) = processor chip.
X (or X-chip) = interface chip.

The output pins that are in the several groupings in Table 1 have the following definitions:

WDP: These are RAM (random access memory) Write Data outputs. This bus is a 64 bit wide, quadword datapath with 14 bits of ECC (error correction code). These are used when there is a command from the P chip to the digital IC chip to send requested write data off of the digital IC chip. As shown in Table 1, there are 78 single-end output pins associated with WDP. Since single-ended output pins have a penalty factor of 1, the SSO penalty factor for WDP is 78.

TAG: These are RAM TAG Data outputs that consist of 12 bits of TAG and 2 write enables and are used to update a physical cache. The TAGs are written in 2 parts, 4 cycles apart. As shown in Table 1, the TAG grouping has 14 single-ended output pins associated with it. Each single-ended pin has penalty factor of 1, so the total TAG SSO penalty factor is 14.

EBUS: This grouping is the Ebus ("external bus") outputs which consist of a 32 bit data bus, command valid bits, parity bits, and control bits. These outputs are ½ bandwidth and, therefore, only need to switch every other CPU cycle. The primary E-bus clock ("ECLK") controls the time when data is placed on the E-BUS. The E-CLK can start at any time cycle following a request for the E-BUS. The alternate clock ("SECLK") is high during the other clock cycle, when the ECLK is low. There are 36 single-ended output pins associated with the EBUS grouping, as shown in Table 1. The total SSO penalty factor for the 36 single-ended output pins is 36, since each single-ended output has a penalty factor of 1.

CF_PX: These are the buses between the digital IC chip and P and X chips. This is the most complicated output group. The 16 low order bits (CF_PX<15:0>) are logically shared by data that is to be sent to the P-chip and/or the X-chip. This group requires arbitration and uses a MUX-latch to determine which data set to send onto the bus. Referring to Table 1, the CF_PX group is associated with 23 single-ended output pins and 46 differential output pins. Since single-ended output pins have a SSO penalty factor of 1, the portion of the total SSO penalty due to single-ended output pins is 23. The SSO penalty factor for the differential pins is determined by expression (1). Therefore, the penalty factor for the 46 differential output pins is 11.5. The total SSO penalty for the CF_PX group is 34.5.

CLKS: These are the forwarded clocks that are sent to the P-chip and the X-chip. They are allowed to switch every cycle. Since the clocks have overriding priority, they are not arbitrated against the other groups. As shown in Table 1, the clocks are associated with 4 differential output pins. The total SSO penalty factor for this grouping according to expression (1) is 1. Since the clocks are not arbitrated, the remaining SSO limit for the other groups is 95.

If the CLKs are removed because they always switch, there are 4 remaining groups for the CARB to arbitrate. Of these groups, there can be 6 combinations of 2 groups switching at the same time, 4 combinations of 3 groups switching at the same time, and 1 combination of 4 groups switching at the same time. Table 2 shows the penalty factors for these combinations.

TABLE 2

| Combinations | Penalty Factor |
|---|---|
| 1 Combination Of 4 Groups | |
| 1. WDP-TAG-EBUS-CF_PX | 162.5 |
| 4 Combinations Of 3 Groups | |
| 1. WDP-TAG-EBUS | 128 |
| 2. WDP-TAG-CF_PX | 126.5 |
| 3. WDP-EBUS-CF_PX | 148.5 |
| 4. TAG-EBUS-CF_PX | 84.5 |
| 6 Combinations Of 2 Groups | |
| 1. WDP-TAG | 82 |
| 2. WDP-EBUS | 114 |
| 3. WDP-CF_PX | 112.5 |
| 4. TAG-EBUS | 50 |
| 5. TAG-CF_PX | 48.5 |
| 6. EBUS-CF_PX | 70.5 |

For the different combinations that are shown in Table 2, the 4 combinations of 3 groups has 1 and the 6 combinations of 2 groups has 4 that are under the 95 SSO limit. Thus, these combinations will not have to be arbitrated. However, all of the remaining combinations will have to be arbitrated because in each the SSO limit is violated.

In the general method of operation, the CARB receives requests for each of the groups for access to output pins. The CARB then determines which of the groups are granted access to output pins at a particular cycle and which have to wait. In order to timely provide the outputs that have been selected for output at a particular time cycle, the actual arbitration takes place at least one cycle before the one that such outputs have requested.

The signals that are to be output are prioritized by the CARB and then dynamically arbitrated. Criteria that the CARB uses to do this includes: the type of request, the priority of each client, the length of time that the signals have been queued for output, and the current clock cycle.

As an example, assume there is a simultaneous switching situation involving the WDP outputs, TAG outputs, and EBUS outputs. The CARB, using the above criteria will, prioritize and then arbitrate when each of the outputs will be granted access to output pins. For this example, further assume the CARB prioritized the outputs as follows: the EBUS outputs have the highest priority, the WDP outputs the second highest priority, and the TAG outputs the lowest priority. The dynamic arbitration by the CARB may be the following:

When the CARB receives the requests for the EBUS outputs, the WDP outputs, and the TAG outputs, it determines the total penalty factor for these three groups is 128. Since 126.5 is greater than the SSO limit of 96, the CARB arbitrates.

The EBUS outputs, which have the highest priority, must be output every other cycle, so, if the very next clock cycle can be an EBUS "on" cycle, and assuming that it is, the CARB will arbitrate that the EBUS outputs will be granted access to 36 output pins. That is, in the arbitration, the EBUS outputs will win over the WDP and TAG outputs. The CARB will continue to arbitrate the remaining groups to see if any may be added to the EBUS outputs but not exceed the SSO limit of 96.

The WDP outputs have the next highest priority of the two remaining groups. The WDP outputs, though, have a SSO penalty factor of 78, and when added to the EBUS output (with a SSO penalty factor of 36), the total SSO penalty factor is 114, which exceeds the 96 SSO limit. The WDP outputs, therefore, will have to wait until the next cycle.

The CARB next arbitrates the addition of the TAG outputs to the EBUS outputs. The TAG outputs have a SSO penalty factor of 14. If the TAG outputs are added to the EBUS outputs (with penalty factor of 36), the total penalty factor is 50, which is below the SSO limit of 96. Hence, at the desired cycle, the CARB grants the EBUS-TAG outputs, which have a penalty factor of 50, access to output pins. The WDP outputs, which have a penalty factor of 78, will wait to be granted access to output pins at the next cycle, even though they originally had a relatively higher priority than the TAG outputs.

The arbitration could also have resulted in the desired cycle including only the EBUS outputs which has a 36 penalty factor In this case, the next cycle would include the WDP-TAG outputs, with a penalty factor of 90. In each of these cases, the SSO limit would not have been violated.

Referring to FIG. 2, an example will be discussed in which the WDP—EBUS-CF_PX outputs want to switch at the same time. In this arbitration situation, state machine results are to be sent to an external device, chip, or apparatus via the CF_PX outputs, there is data that has to be written to the RAM via the WDP outputs, and there is other data that has to be sent out via the EBUS outputs.

For this example, it is assumed the CARB has prioritized the EBUS, WDP, and CF_PX outputs as follows: the EBUS outputs have the highest priority, the WDP outputs have the next highest priority, and the CF_PX outputs have the lowest priority.

The timing diagrams and data envelopes that apply to the arbitration are shown in FIG. 2. In that Figure, the time period designations, T0 to T7, are shown at 200, the main CPU clock ("CPU CLK") timing diagram is shown at 202, the E-bus "on" clock ("ECLK") timing diagram is shown at 204, the E-bus "off" clock ("SECLK") timing diagram is shown at 206, the state machine request timing diagram is shown at 208, the timing diagram for a request for the E-bus is shown at 210, the timing diagram for a request to write to the RAM is shown at 212, the EBUS OUT data envelopes are shown at 214, the WDP OUT data envelope is shown at 216, the CF_PX OUT data envelopes are shown at 218, the groups that are switching at each time period, T0 to T7, are shown at 220, and the SSO penalty factors for each of the time periods, T0 to T7, are shown at 222.

At a starting clock cycle, time T0, the CARB sees a request from the state machine for the output of that machine's results via the CF_PX outputs. The rising edge of this request is at time T0 and the falling edge is at time T6, as shown at 208. Hence, through these times the request is active.

The CF_PX outputs are last in priority, but the CARB grants its request for access to output pins because there is no higher priority requests at time T0 (See FIG. 2 at 208). In fact, there are no other requests at T0. At T0, there is a penalty factor 34.5 for the CF_PX outputs, plus 1 for the clocks (see Table 1).

At time T1, however, the CARB sees requests for switching all three output groups. That is, the request for the EBUS outputs that is shown by the timing diagram at 210, the request for the WDP outputs to write to a RAM is shown by the timing diagram at 212, as well as the request for the CF_PX outputs for the continuation of the results which, as stated, is shown by the timing diagram at 208. As set forth above, the CARB has prioritized the outputs in the decreasing order: EBUS outputs, WDP outputs, and CF_PX outputs.

Once the ECLK starts after a request for the EBUS, such as is shown at 210, as determined by the CARB, it continues to run until the end of the Ebus transaction. It just so happens in this case that the EBUS outputs have the highest priority and are given access to the output pins at time T2. Hence, the ECLK starts running at that time.

With the requests having been input to CARB, it arbitrates them at time T1-T2. The CARB determines that the total SSO penalty factor for all three groups is 149.5, which exceeds the SSO limit of 96. After making this determination, the CARB arbitrates the prioritized outputs.

The results of the arbitration are that at time T2, the request for the EBUS outputs is granted since it has the highest priority, and therefore time T2 is an "on" cycle for the EBUS outputs, as shown by the timing diagrams for the ECLK at 204 and for the SECLK at 206. The CARB now arbitrates the WDP outputs with the EBUS outputs since the WDP outputs have the next highest priority. The total SSO penalty factor is 114, which exceeds the SSO limit of 96, so the WDP outputs will have to wait until the next cycle.

The CARB now arbitrates the CF_PX outputs which has the lowest priority and SSO penalty of 34.5 with the EBUS outputs. If these outputs are added to the EBUS outputs (with SSO penalty of 36), the total SSO penalty factor is 70.5. Since this total is below the SSO limit of 96, the CARB grants the request for the CF_PX outputs to have access to the CF_PX output pins. So, at time T2, the EBUS-CF_PX outputs, as shown at 214 and 218, respectively, are granted access to output pins. These outputs have a penalty factor of 70.5, plus 1 for the penalty factor for the clocks (see no. of SSOs at 222). The WDP outputs are scheduled to wait, as is shown by "Groups Switching" at 220.

At time T3, which is an "off" cycle for the EBUS outputs, as shown by the timing diagrams for the ECLK at 204 and for the SECLK at 206, there are requests for the WDP outputs at 212 with a penalty factor of 78 and the CF_PX outputs at 208 with a penalty factor of 34.5, plus 1 for the penalty factor for the clocks for a total penalty factor of 113.5. The CARB arbitrates the outputs, with the result being that the WDP outputs, which have a higher priority than the CF_PX outputs, are granted access to output pins. Since the WDP output request has been queued since time T1, it is given immediate access to the output pins.

The CARB now arbitrates the CF_PX outputs with the WDP outputs. The WDP outputs have a penalty factor of 78 and the CF_PX outputs a penalty factor of 34.5. The total penalty factor is 112.5, which exceeds the SSO penalty limit of 95 (not counting the clock penalty factor). Hence, the CF_PX outputs will have to wait until the next cycle to have access to output pins.

Time T4 is an "on" cycle for the EBUS outputs, as indicated by the timing diagrams for the ECLK at 204 and for the SECLK at 206. At this time, there are requests for switching the EBUS-CF_PX outputs. The request for the EBUS outputs at this time is based on the fact that after the initial request is made on 210 at T1, every "on" cycle for the EBUS is to be construed as a request for the EBUS outputs to have access to output pins.

The still active CF_PX request is shown at 208. EBUS has the highest priority and CF_PX has the lowest priority. Since these are only requests at this time and their combined SSO penalty factor is 70.5, plus 1 for the penalty factor for the clocks, the requests are granted and the CARB does not even arbitrate.

At time T5, which is an "off" cycle for the EBUS outputs, which is demonstrated by the timing diagrams for the ECLK at 204 and for the SECLK at 206, there is a request for switching the CF_PX outputs (See FIG. 2 at 208) and no others. The penalty factor, therefore, is 34.5, plus 1 for the penalty factor for the clocks. This request is granted without arbitration.

At time T6, which is an "on" cycle for the EBUS outputs, as demonstrated by the timing diagram for the ECLK at 204 and for the SECLK at 206, there is a request for the EBUS and no others. The penalty factor, therefore, is 36, plus 1 for the penalty factor for the clocks. This request is granted without any arbitration.

At time T7, there are no outstanding requests, so the only penalty factor at each is the penalty factor of 1 for the clocks.

In the above example, the priority for the EBUS, WDP, and CF_PX outputs changed during times T0–T7 as CARB evaluated the requests for outputs on a cycle-by-cycle basis. This adaption to a changing logical environment within the IC is one of features of this invention.

The terms and expressions that are used herein are used as terms of expression and not of limitation. And, there is no intention in the use of such terms and expressions of excluding the equivalents of the features shown and described, or portions thereof, it being recognized that various modifications are possible in the scope of the invention.

We claim:

1. A system for limiting the number of simultaneously switching outputs of an integrated circuit chip at or below a predetermined limit for the chip during a short, predetermined time window, comprising means for arbitrating, according to the simultaneous switching output limit of the chip, the use of M chip resources of a predetermined type of which only N of such chip resources are used during said short, predetermined time window, with $N>0$, $M>0$, and $N \leq M$.

2. The system as recited in claim 1, wherein the means for arbitrating dynamically arbitrates said use of the M chip resources.

3. The system as recited in claim 2, wherein the chip resources are output pins.

4. A system for limiting the number of simultaneously switching outputs of an integrated circuit chip at or below a predetermined limit for the chip during each of a plurality of short, predetermined time windows, comprising means for arbitrating, according to the simultaneous switching output limit of the chip, the use of M chip resources of a predetermined type of which only N of such chip resources are used during each of the said time windows, with $N>0$, $M>0$, and $N \leq M$.

5. The system as recited in claim 4, wherein the means for arbitrating independently determines N for each of said time periods.

6. The system as recited in claim 4, wherein the means for arbitrating dynamically arbitrates said use of the M chip resources.

7. The system as recited in claim 6, wherein the chip resources are output pins.

8. A system for limiting the number of simultaneously switching outputs of an integrated circuit chip at or below a predetermined limit for the chip during a short, predetermined time window, comprising means for arbitrating request signals from discrete on-chip logic elements for assignment of output pins according to the simultaneous switching output limit of the chip to a priority of the request signals based on the type and intended use of output signals from such elements.

9. The system as recited in claim 8, wherein the means for arbitrating the request signals dynamically arbitrates said request signals.

10. The system as recited in claim 9, wherein the means for arbitrating further includes means for sending request granted signals to the discrete on-chip logic elements that are selected in arbitration and granted access to output pins for the short, predetermined time window.

11. A system for limiting the number of simultaneously switching outputs of an integrated circuit chip at or below a predetermined limit for the chip during each of a plurality of short, predetermined time windows, comprising means for arbitrating request signals from discrete on-chip logic elements for each of the plurality of time windows for assignment of output pins during each of the said time windows according to the simultaneous switching output limit of the chip and to a priority of the request signals based on the type and intended use of output signals from such elements.

12. The system as recited in claim 11, wherein the means for arbitrating the request signals dynamically arbitrates said request signals.

13. The system as recited in claim 12, wherein the means for arbitrating further includes means for sending request granted signals to the discrete on-chip logic elements that are selected in arbitration and granted access to output pins for each of said time windows.

14. A system for limiting the number of simultaneously switching outputs of an integrated circuit chip to at or below a predetermined limit for the chip, comprising:

arbitration means that further comprises,
  means for receiving from discrete on-chip logic elements request signals to use a particular number of output pins during a short, predetermined time window, means for assigning a priority to each of the requests based on type and intended use of signals for which the request signals are generated, means for arbitrating the request signals according to the priority of the request signals and the simultaneous switching output limit of the chip, and means for sending a request granted signal to the discrete on-chip logic elements that are selected in arbitration and granted access to output pins for the time window.

15. The system as recited in claim 14, wherein the means for arbitrating the request signals dynamically arbitrates said request signals.

16. A system for limiting the number of simultaneously switching outputs of an integrated circuit chip to at or below a predetermined limit for the chip, comprising:

arbitration means which further comprises, means for receiving from discrete on-chip logic elements request signals to use the output pins during a plurality of short, predetermined time windows;

means for assigning a priority to each of the request signals based on type and intended use of signals that are to be output, and the particular time window for which output is requested;

means for arbitrating the request signals according to the priority of such request signals for a particular time window for which output is requested and the simultaneous switching output limit of the chip; and means for sending a request granted signal to the discrete on-chip logic elements that are selected in arbitration and granted access to output pins for the particular time window for which output is requested.

17. The system as recited in claim 16, wherein the means for arbitrating the request signals dynamically arbitrates said requests.

18. A system for limiting the number of simultaneously switching outputs of an integrated circuit chip to at or below a predetermined limit for the chip, comprising:

means for assigning a value to each output pin of the chip based on the output pin type;

means for receiving request signals to use a particular number of output pins during a short, predetermined time window;

means for assigning a priority to each of the request signals based on type and intended use of signals for which the request signals are generated;

means for arbitrating the request signals according to the priority of such request signals and the simultaneous switching output limit of the chip; and means for sending a request granted signal to the discrete on-chip logic elements that are selected in arbitration and granted access to output pins for the time window.

19. The system as recited in claim 18, wherein the means for arbitrating the request signals dynamically arbitrates said request signals.

20. A system for limiting the number of simultaneously switching outputs of an integrated circuit chip to at or below a predetermined limit for the chip, comprising:

means for assigning a value to each output pin of the chip based on the output pin type; and arbitration means that further comprises, means for receiving from discrete on-chip logic elements request signals for use of the output pins during a plurality of short, predetermined time windows, means for assigning a priority to each of the request signals based on type and intended use of signals for which request signals are generated, and the particular time window for which output is requested, means for arbitrating the request signals according to the priority of such request signals for a particular time window for which output is requested and the simultaneous switching output limit of the chip, and means for sending a request granted signal to the discrete on-chip logic elements that are selected in arbitration and granted access to output pins for the particular time windows for which output is requested.

21. The system as recited in claim 20, wherein the means for arbitrating the request signals dynamically arbitrates said request signals.

22. A method for limiting the number of simultaneously switching outputs of an integrated circuit chip at or below a predetermined limit for the chip during a short, predetermined time window, comprising arbitrating, according to the simultaneous switching output limit of the chip, the use of M chip resources of a predetermined type of which only N of such chip resources are used during said short, predetermined time window, with $N>0$, $M>0$, and $N \leq M$.

23. The method as recited in claim 22, wherein arbitrating includes dynamically arbitrating said use of M chip resources.

24. The method as recited in claim 23, wherein arbitrating chip resources includes arbitrating output pins.

25. A method for limiting the number of simultaneously switching outputs of an integrated circuit chip at or below a predetermined limit for the chip during each of a plurality of short, predetermined time windows, comprising arbitrating, according to the simultaneous switching output limit of the chip, the use of M chip resources of a predetermined type of which only N of such chip resources are used during each of the said time windows, with $N>0$, $M>0$, and $N \leq M$.

26. The method as recited in claim 25, wherein arbitrating includes independently determining N for each of said time periods.

27. The method as recited in claim 25, wherein arbitrating includes dynamically arbitrating the use of M chip resources.

28. The method as recited in claim 27, wherein arbitrating chip resources includes arbitrating output pins.

29. A method for limiting the number of simultaneously switching outputs of an integrated circuit chip at or below a predetermined limit for the chip during a short, predetermined time window, comprising arbitrating request signals from discrete on-chip logic elements for assignment of output pins according to the simultaneous switching output limit of the chip and to a priority of the request signals based on the type and intended use of output signals from such elements.

30. The method as recited in claim 29, wherein arbitrating the request signals includes dynamically arbitrating said request signals.

31. The method as recited in claim 30, wherein the method further includes sending request granted signals to the discrete on-chip logic elements that are selected in arbitration and granted access to output pins for the short, predetermined time window.

32. A method for limiting the number of simultaneously switching outputs of an integrated circuit chip at or below a predetermined limit for the chip during each of a plurality of short, predetermined time windows, comprising arbitrating request signals from discrete on-chip logic elements for each of the plurality of time windows for assignment of output pins during each of the said time windows according to the simultaneous switching output limit of the chip and to a priority of the request signals based on the type and intended use of output signals from such elements.

33. The method as recited in claim 32, wherein arbitrating the request signals includes dynamically arbitrating said request signals.

34. The method as recited in claim 33, wherein the method further includes sending request granted signals to the discrete on-chip logic elements that are selected in arbitration and granted access to output pins for each of said time windows.

35. A method for limiting the number of simultaneously switching outputs of an integrated circuit chip to at or below a predetermined limit for the chip, comprising the steps of:
   (a) assigning a value to each output pin of the chip based on the output pin type;
   (b) receiving from discrete on-chip logic elements request signals to use a particular number of output pins during a short, predetermined time window;
   (c) assigning a priority to each of the request signals based on type and intended use of signals for which the request signals are generated;
   (d) arbitrating the request signals according to the priority of such request signals and the simultaneous switching output limit of the chip; and
   (e) sending a request granted signal to the discrete on-chip logic elements that are selected in arbitration and granted access to output pins for the time window.

36. The method as recited in claim 35, wherein the arbitrating step further includes dynamically arbitrating said request signals.

37. A method system for limiting the number of simultaneously switching outputs of an integrated circuit chip to at or below a predetermined limit for the chip, comprising the steps of:
   (a) assigning a value to each output pin of the chip based on the output pin type; and
   (b) receiving from discrete on-chip logic elements request signals to use particular output pins during a plurality of short, predetermined time windows;
   (c) assigning a priority to each of the request signals based on type and intended use of signals for which request signals are generated, and the particular time window for which output is requested;
   (d) arbitrating the request signals according to the priority of such request signals for the particular time window for which output is requested and the simultaneous switching limit of the chip; and
   (e) sending a request granted signal to the discrete on-chip logic elements that are selected in arbitration and granted access to output pins for the particular time window for which output is requested.

38. The method as recited in claim 37, wherein the arbitrating step further includes dynamically arbitrating said request signals.

39. A method for limiting the number of simultaneously switching outputs of an integrated circuit chip to at or below a predetermined limit for the chip, comprising the steps of:
   (a) receiving from discrete on-chip logic elements request signals to use a particular number of output pins during a short, predetermined time window;
   (b) assigning a priority to each of the request signals based on type and intended use of signals for which request signals are generated;
   (c) arbitrating the request signals according to the priority of such request signals and the simultaneous switching output limit of the chip; and
   (d) sending a request granted signal to the discrete on-chip logic elements that are selected in arbitration and granted access to output pins for the time window.

40. The method as recited in claim 39, wherein the arbitrating step further includes dynamically arbitrating said request signals.

41. A method for limiting the number of simultaneously switching outputs of an integrated circuit chip to at or below a predetermined limit of the chip, comprising the steps of:
   (a) receiving from discrete on-chip logic elements request signals to use the output pins during a plurality of short, predetermined time windows;
   (b) assigning a priority to each of the request signals based on type and intended use of signals for which request signals are generated, and the particular time window for which output is requested;
   (c) arbitrating the request signals according to the priority of such request signals for the particular time window for which output is requested and the simultaneous switching limit of the chip; and
   (d) sending a request granted signal to the discrete on-chip logic elements that are selected in arbitration and granted access to output pins for the particular time window for which output is requested.

42. The method as recited in claim 41, wherein the arbitrating step further includes dynamically arbitrating said request signals.

* * * * *